United States Patent

Kröger et al.

[11] Patent Number: 5,862,891
[45] Date of Patent: Jan. 26, 1999

[54] ELECTROMAGNETIC OR PERMANENT-MAGNETIC RAIL BRAKE

[75] Inventors: Uwe Kröger; Heinrich Grautstück, both of Munich; Wolfgang Wirth, Regensburg, all of Germany

[73] Assignee: Knorr-Bremse Systeme Fur Scheinenfahrzeuge GmbH, Munich, Germany

[21] Appl. No.: 836,064

[22] PCT Filed: Aug. 29, 1994

[86] PCT No.: PCT/DE95/01153

§ 371 Date: Apr. 22, 1997

§ 102(e) Date: Apr. 22, 1997

[87] PCT Pub. No.: WO96/13419

PCT Pub. Date: May 9, 1996

[30] Foreign Application Priority Data

Oct. 28, 1994 [DE] Germany .......................... 44 38 609.5

[51] Int. Cl.$^6$ ........................................................ B60L 7/00
[52] U.S. Cl. ............................ 188/165; 188/164; 105/77
[58] Field of Search .................................. 188/161, 164, 188/165, 41; 335/281, 304; 105/77, 78; 336/212, 214, 217, 219

[56] References Cited

U.S. PATENT DOCUMENTS

| 3,805,927 | 4/1974 | Tolksdorf . | |
|---|---|---|---|
| 3,840,096 | 10/1974 | Tolksdorf . | |
| 4,144,954 | 3/1979 | Farello et al. . | |
| 4,299,312 | 11/1981 | Bengtsson | 188/165 |
| 4,305,485 | 12/1981 | Dubreucq | 188/164 |
| 5,138,393 | 8/1992 | Okamura | 335/297 |
| 5,647,458 | 7/1997 | Van der Sloot | 188/165 |

FOREIGN PATENT DOCUMENTS

| 802 215 | 8/1936 | France . |
|---|---|---|
| 2 366 970 | 5/1978 | France . |

OTHER PUBLICATIONS

Grundlagen der Schienenfahrzeug Bremse, Eckart Saumweber, Eduard Gerum, Peter J. Berndt.

Primary Examiner—Robert J. Oberleitner
Assistant Examiner—C. T. Bartz
Attorney, Agent, or Firm—Barnes & Thornburg

[57] ABSTRACT

A magnetic rail brake, particularly an eddy current brake for rail vehicles, has at least one exciter coil which comprises a coil around a pole core as well as a device for holding the coil and/or for the protection against outside environmental influences. The pole core and/or protection device are composed of individual components which are at least largely electrically insulated with respect to one another.

12 Claims, 3 Drawing Sheets

ELECTROMAGNETIC OR PERMANENT-MAGNETIC RAIL BRAKE

BACKGROUND AND SUMMARY OF THE INVENTION

The invention relates generally to an electromagnetic or permanent-magnetic rail brake, and more particularly to a linear eddy current brake for rail vehicles.

In modern wheel/rail engineering, there is demand for brake technologies which have a brake force that is as much as possible independent of the coefficient of adhesion between the wheel and the rail. Linear eddy current brakes naturally meet this requirement in an ideal fashion because, as non-contact service brakes, they are absolutely independent of the coefficient of adhesion.

A short introduction into the technology of the eddy current brakes for rail vehicles—whose function is based on the law of induction—is found, for example, in the book by Saumweber, et al. "AET—Archiv für Eisenbahntechnik (Archive for Railway Technology)"—Hestra Publishers, Volume 43, Chapter 2.5.2. Eddy current brakes consist of an iron yoke with several pole cores. Electric coils magnetically excite the brake such that magnetic north and south poles are generated in an alternating manner. When the excited eddy current brake is moved along the rail—that is, during a braking—, electromagnetic fields and eddy currents are generated as a result of the changes of the time rate of flow. The secondary magnetic field caused by the eddy currents is opposed to the magnetic field of the brake. The resulting horizontal force component which acts opposite to the travelling direction is the brake force.

Despite the important advantage of this brake of having no contact with respect to rail, the practical use of eddy current brakes in large part is delayed by the fact that the compatibility of the brake with the existing operating equipment of various railroad operators can still be optimized.

A problem of the above-mentioned type, which results in serious difficulties during the practical application, is the interfering influence of the eddy current brakes on electromagnetic axle counters and/or similar sensing devices.

This problem is described in detail in European Patent Document EP 0 309 651. A large portion of the currently existing track sections of the varied railroad operators have rails which are provided with axle counting sensors laterally below the rail surface. Generally, electromagnetic sensors are used for the axle counting. That is, a transmitter sends out an electromagnetic alternating field (of a frequency of 5 to typically 43 kHz) and, when a metal wheel travels over a sensor arranged on the opposite side of the rail, the sensor registers changes of the electric field, which are caused by the metal wheel, with respect to the amplitude and the direction as counting pulses. A train passing through the sensor arrangements triggers a counting pulse in the sensors by each axle or wheel passing there through. If, during a pass through locally mutually separate axle counters, different counting results are registered, the track section is blocked for the following train.

Since, during a braking, eddy current brakes are lowered from a high position into a low position just above the rail, they may also trigger counting pulses in the axle counting sensors during the braking. However, they trigger counting pulses only in their low position (thus, during the braking) but not in their high position. Eddy current brakes may therefore falsify the result of an axle count and stop a train for no reason.

For solving this problem, European Patent Document EP 0 309 651 A2 suggests that guiding plates made of a ferromagnetic material be mounted on the outside in the area of the lower longitudinal edges of each coil of the brake magnet. These guiding plates each extend along the lower corner edges of the exciter coil. Although the suggested solution eases the problem, faulty signals cannot be excluded to an extent required for a controlled train operation.

From Austrian Patent Document 317 290, corresponding to U.S. Pat. No. 3,805,927, an electromagnetic rail brake is known in which a rod made of a ferromagnetic material extends along the length of the electromagnetic rail brake to reduce disturbing influences. This solution also does not meet the requirements of a high-speed traffic of eliminating disturbances from the rail operation.

The invention is based on the problem of providing an electromagnetic or permanent-magnetic rail brake—particularly an eddy current brake—for rail vehicles which does not interfere with sensing devices, such as axle counters, during braking operations.

The invention implements particularly an eddy current brake for rail vehicles having at least one exciter coil which has a coil around a pole core and also has a device for holding the coil and/or for the protection against outside environmental influences. The pole core and/or the protection device is composed of individual components which are at least largely electrically insulated with respect to one another.

The division into separate individual components interrupts the transmission of a transmitted signal from a transmitter on one side of the rail to a receiver on the other side of the rail. Thus, virtually no more interfering signals occur and the use of the eddy current brake becomes possible in a large portion of the existing track systems. This basically constructively simple measure effectively prevents interfering signals. The invention therefore provides a decisive step in the penetration of the market by means of the technically advantageous eddy current brake technology.

A large number of the axle counters, which are currently used in practices are designed such that a metal wheel passing though the sensor in the receiver section produces a clearly recordable voltage change; for example, in one embodiment of the sensor, a voltage increase. This effect is prevented by the invention. In this variant, a weakening of the signal may even take place by the brake according to the invention. Counting pulses are no longer triggered.

According to another embodiment of the invention, the protection device is designed as a multipart metal housing, in which case the individual metal sections are insulated with respect to one another in the mounted position of the brake in which the longitudinal axis of the brake is aligned essentially along the longitudinal axis of the rail. Correspondingly, it is advantageous for the pole core to have at least two metal plates which are essentially insulated with respect to one another in the mounted position of the brake. Because of the skin effect, the wave transmission takes place essentially on the surface of the metal components. The division into individual layers effectively interrupts this transmission.

According to another embodiment of the invention, at least one of the metal plates is ferromagnetic. Steel can be selected for reaching good electric transmission characteristics. In this case, the metal plates are arranged in a plane perpendicular to the longitudinal axis of the rail.

In another embodiment, steel plates of the pole core are separated from one another by transformer plates. For example, five steel plates and four transformer plates are used. This embodiment achieves very good results with respect to the freedom from disturbances of axle counters without high demands constructively on the manufacturing of the pole core that, for reasons of cost, an implementation of the product would be made more difficult.

A metal housing is generally used for protecting the coils. According to the invention, it was found to be particularly advantageous for the metal housing to have lateral surfaces which are open transversely to the longitudinal axis of the brake. The partially open lateral surfaces also have an advantageous effect on the field distribution (short-circuit effect) and promote the effect of the laminated core. In further embodiments of the invention, at least one exciter coil is arranged in a housing made of glass fiber reinforced plastic and is fastened by a U-shaped carrying device on a brake anchor plate; and/or the metal plates are screwed to one another and/or are glued to one another, and are therefore mechanically connected with one another in a non-conductive manner.

By the invention, an eddy current brake (or a rail vehicle with such a brake) can be implemented in an advantageous manner which meets the requirements with respect to the freedom from disturbances of most different high-speed railway lines, such as the ICE-train and the TGV-train.

In the following, the invention will be described in detail with reference to the drawing by means of embodiments, in which case additional advantages and possibilities of the invention also become clear.

DETAILED DESCRIPTION OF THE PREFERRED EMBODIMENTS

Figure 1:
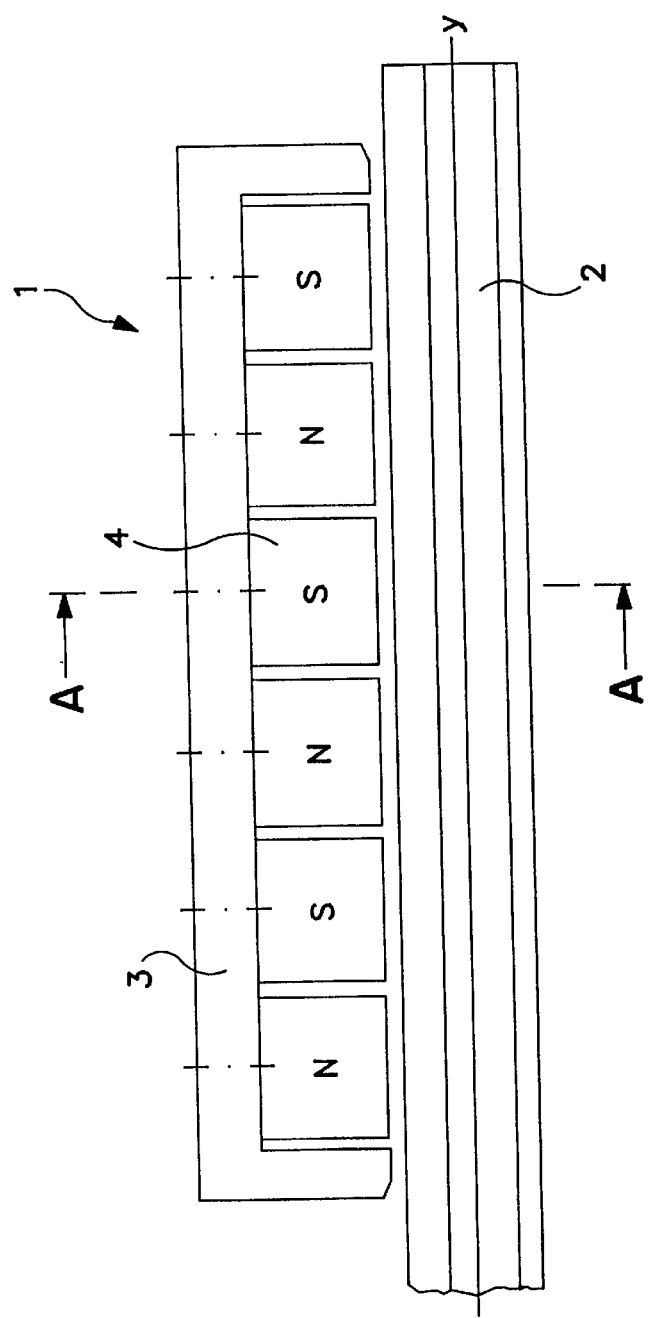
FIG. 1 is a side view of a first embodiment of an eddy current brake according to the invention.

First the embodiment of FIG. 1 shows an eddy current brake 1 which can be fastened to a pivoted bogie (which is not shown). During a braking operation of the train, the eddy current brake is held at a short distance in parallel to a rail 3. It has a brake anchor plate 3 on which exciter coils 4 are arranged and which can be magnetized in an alternating manner in a north/south sequence. The totality of the exciter coils 4 together with the anchor plate 3 are called the "brake magnet".

Figure 2:
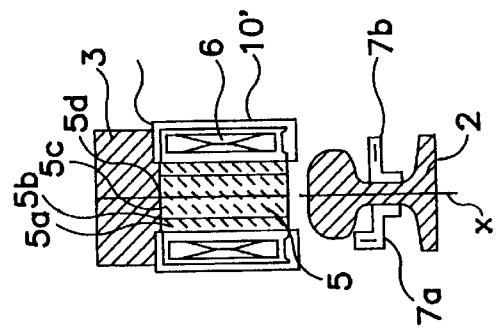
FIG. 2 is a sectional view along Line A–A' of the embodiment from FIG. 1.

FIG. 2 illustrates the construction and the mounted position of one of the exciter coils 4 of FIG. 1. The sectional view illustrates a metal core 5 around which coil windings 6 are wound. In turn, the metal core 5 has several individual metal plates 5a, 5b, etc. electrically insulated from each other as in a laminated core. The metal core 5 is arranged on the anchor plate 3 such that the individual metal plates 5a, 5b are situated on the extension of the rail axis X and in the plane or in parallel to the plane defined by the rails axes X and Y. Laterally of the rail 2, a sensing device 7 is schematically shown which has a transmitter part 7a and a receiver part 7b.

Figure 3:
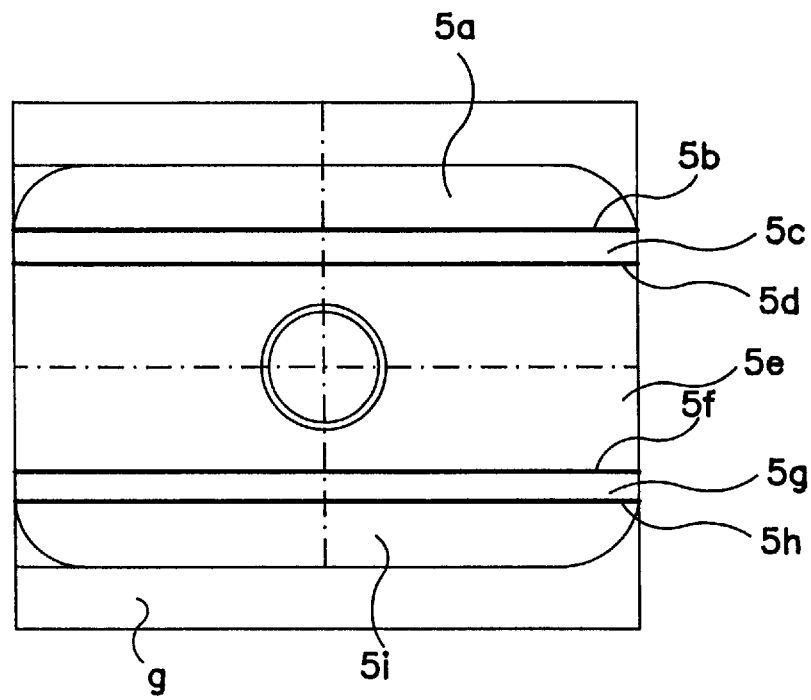
FIG. 3 is a top view of a schematically illustrated pole core constructed according to the invention in a further embodiment of the invention.
Figure 4:
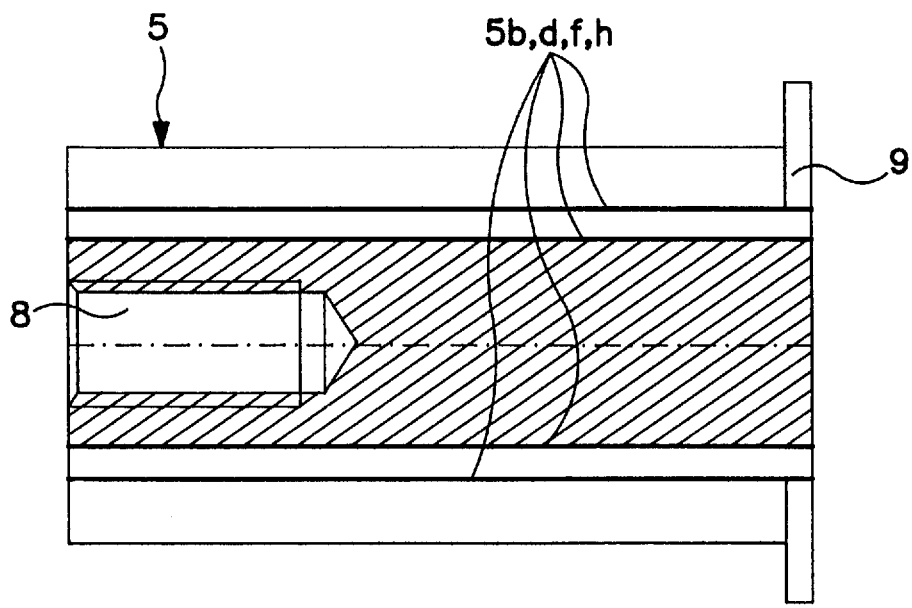
FIG. 4 is a partially cut lateral view of the pole core from FIG. 3.

FIGS. 3 and 4 show an embodiment of a coil core 5 of an eddy current brake according to the invention which, because of a bundling of individual metal plates 5a–5i, has particularly good electromagnetic transmission characteristics; that is, they avoid interfering signals in the axle counters 7. The metal plates 5a, 5c, 5e, 5g, 5i of the pole core 5 are designed as steel plates and the metal layers 5b, 5d, 5f, 5h are designed as transformer plates—that is, as plates with a ferromagnetic characteristic; and the plates 5b, 5d, 5f, 5h may also be insulators. The center steel plate 5e is particularly strong and provides stability to the pole core. A threaded bore 8 is used for fastening the pole core to the anchor plate 3 by a (not shown) stud. An (optionally multipart) base plate 9 carries the coil 6 (see FIG. 5 and 6).

Figure 5:
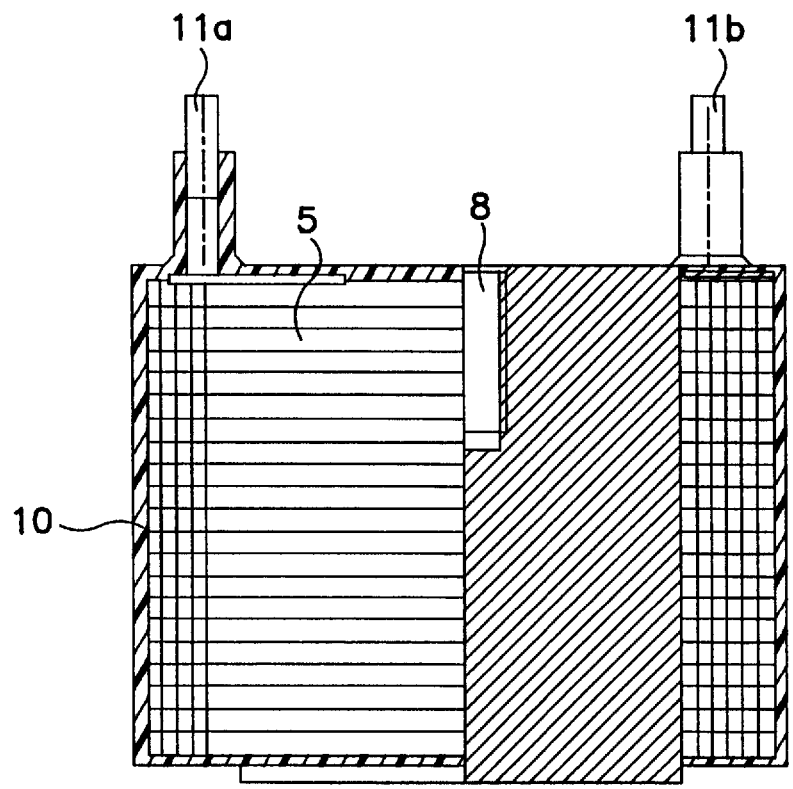
FIG. 5 is a partially cut lateral view of another embodiment of an exciter coil according to the invention.
Figure 6:
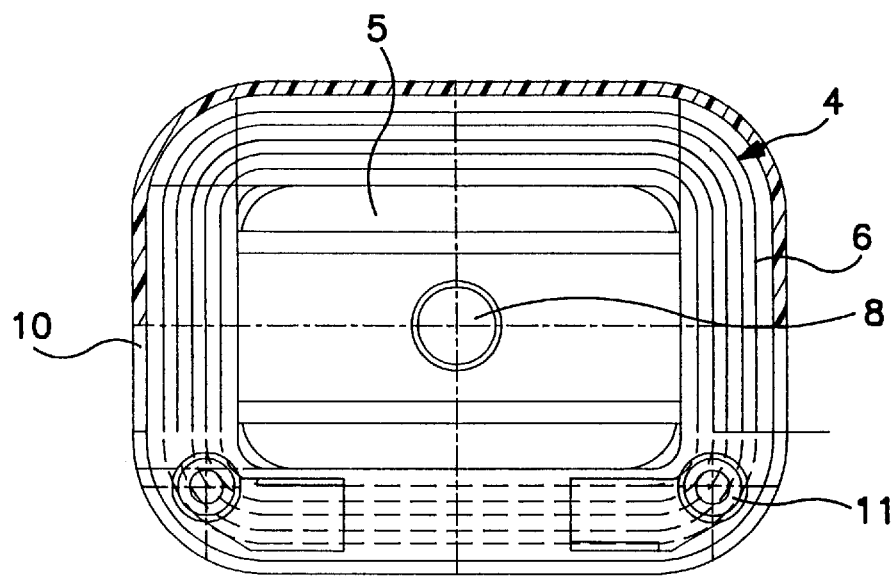
FIG. 6 is a top view of the exciter coil of FIG. 5.

FIGS. 5 and 6 illustrate the mounted position of the exciter coil 4 arranged in a housing (or box) 10 (protection device) made of a glass fiber reinforced plastic (GFK). The layered or laminated construction of the coil core 5 of the type of FIGS. 3 and 4 is easily recognizable. The coil windings 6 of the exciter coil 4 which surround the coil core 5 are schematically outlined. The plastic housing 10 encloses the exciter coil 4 on all sides. Connections 11a and 11b are used for supplying electric energy.

If a metallic protection device is used instead of the plastic housing 10, it is advantageous to laterally open this metallic protection device transversely with respect to the rail or to design it according to the type of FIG. 2 as double yokes 10' which border the exciter coil 4 along the rail transversely with respect to the rail but physically separated from another and are therefore electrically insulated with respect to one another. Instead of a housing, such a yoke-type double bordering 10' is provided in FIG. 1 as the protection device for protecting against outside environmental influences, such as stoning, and for fastening the exciter coil 4. The yoke bordering 10' is open on its bottom side, thus, in the mounted position, toward the rail as well as transversely to the rail (thus in an area in which the exciter coils 4 are already disposed closely side-by-side). The yoke is a U-shaped carrying device.

Although the present invention has been described and illustrated in detail, it is to be clearly understood that the same is by way of illustration and example only, and is not to be taken by way of limitation. The principle is applicable to electro-magnetic and permanent magnetic brake structures. The spirit and scope of the present invention are to be limited only by the terms of the appended claims.

We claim:

1. A magnetic rail brake for a rail vehicle comprising:
   at least one exciter coil which has a coil around a core;
   the core including at least two individual components each having a longitudinal axis parallel to a longitudinal axis of a rail; and
   the individual components being separated from each other transverse to the longitudinal axis of the rail and being electrically insulated with respect to each other.

2. A brake according to claim 1, including a multipart metal housing, individual metal sections of the housing being electrically insulated with respect to one another in a mounted position of the brake wherein a longitudinal axis of the brake is essentially aligned along the longitudinal axis of a rail.

3. A brake according to claim 1 wherin the core has at least two metal plates which are essentially electrically insulated with respect to one another in mounted position of the brake.

4. A brake according to claim 3, wherein at least one of the metal plates is ferromagnetic.

5. A brake according to claim 1, wherein the core includes steel plates which are additionally separated from one another by transformer plates.

6. A brake according to claim 1, including a metal housing having lateral surfaces which are open transversely to a longitudinal axis of the brake which is essentially aligned with the longitudinal axis of a rail.

7. A brake according to claim 1, including a plastic housing.

8. A brake according to claim 1, a U-shaped carrying device fastening the at least one exciter coil to a brake anchor plate.

9. A brake according to claim 1, wherein the core includes metal plates mechanically connected with one another in a non-conductive manner.

10. A rail vehicle for traveling on railway lines whose rails are provided with magnetic sensing devices, particularly axle counters, including a magnetic rail brake, according to claim 1, which is also adapted to be positioned within the field of the magnetic sensing device.

11. A brake according to claim 1, including an anchor plate to mount the exciter coil with the core's longitudinal axis along the longitudinal axis of the rail.

12. A brake according to claim 1, including a plurality of exciter coils spaced along the longitudinal axis of the rail and having alternating polarity.

* * * * *